US010961863B2

(12) United States Patent
Scothern

(10) Patent No.: US 10,961,863 B2
(45) Date of Patent: Mar. 30, 2021

(54) ELECTRICAL POWER GENERATOR SYSTEM

(71) Applicant: ROLLS-ROYCE plc, London (GB)

(72) Inventor: David P. Scothern, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 16/286,714

(22) Filed: Feb. 27, 2019

(65) Prior Publication Data
US 2019/0284948 A1    Sep. 19, 2019

(30) Foreign Application Priority Data
Mar. 15, 2018  (GB) ..................... 1804128

(51) Int. Cl.
*F01D 15/10*  (2006.01)
*F02C 3/10*  (2006.01)
(Continued)

(52) U.S. Cl.
CPC ............... *F01D 15/10* (2013.01); *F02C 3/10* (2013.01); *F02C 3/113* (2013.01); *F02C 7/32* (2013.01); *F02C 7/36* (2013.01); *F03D 9/25* (2016.05); *F03D 15/00* (2016.05); *H02K 7/116* (2013.01); *H02K 7/1823* (2013.01);
(Continued)

(58) Field of Classification Search
CPC ......... F05B 2260/4031; F05D 2220/76; F05D 2260/4031; F05D 2270/061; F05D 2270/304; H02K 16/00; H02K 2213/09; H02K 7/116; H02K 7/1823; F03D 9/25;
(Continued)

(56) References Cited

U.S. PATENT DOCUMENTS 4,461,957 A * 7/1984 Jallen .................... F03D 7/0272
290/44
2007/0151258 A1    7/2007 Gaines et al.
(Continued)

FOREIGN PATENT DOCUMENTS

EP     1731735 A2    12/2006
EP     2657457        10/2013
(Continued)

OTHER PUBLICATIONS

Great Britain search report dated Sep. 13, 2018, issued in GB Patent Application No. 1804128.5.
(Continued)

*Primary Examiner* — Charles Reid, Jr.
(74) *Attorney, Agent, or Firm* — Shumaker & Sieffert, P.A.

(57) ABSTRACT

An electrical power generator system has: an input shaft for receiving a rotary input drive; plural output shafts connected by respective gear shifting arrangements to the input shaft thereby providing different gear ratios between the input shaft and each output shaft; and plural electrical generators powered by rotation of the respective output shafts, electrical power outputs of the generators being combined to supply a total power to a load. The input shaft operates over a range of rotation frequencies, and the gear shifting arrangements are configured to shift the gear ratios between the input shaft and the output shafts such that the output shafts operate over a narrower range of rotation frequencies.

13 Claims, 2 Drawing Sheets

(51) Int. Cl.
*F02C 3/113* (2006.01)
*F02C 7/36* (2006.01)
*F03D 9/25* (2016.01)
*F02C 7/32* (2006.01)
*H02K 7/116* (2006.01)
*H02K 7/18* (2006.01)
*F03D 15/00* (2016.01)
*H02K 16/00* (2006.01)

(52) U.S. Cl.
CPC .. *F05B 2260/4031* (2013.01); *F05D 2220/76* (2013.01); *F05D 2260/4031* (2013.01); *F05D 2270/061* (2013.01); *F05D 2270/304* (2013.01); *H02K 16/00* (2013.01); *H02K 2213/09* (2013.01)

(58) Field of Classification Search
CPC .. F03D 15/00; F02C 3/10; F02C 3/113; F02C 7/32; F02C 7/36; F01D 15/10
USPC ........................................................ 290/52
See application file for complete search history.

(56) References Cited

U.S. PATENT DOCUMENTS

| | | | | |
|---|---|---|---|---|
| 2012/0122631 A1* | 5/2012 | Galivel | .................. | F01D 15/10 477/15 |
| 2012/0319661 A1* | 12/2012 | Moore | .................. | F16H 3/724 322/40 |
| 2013/0152602 A1* | 6/2013 | Bacic | ...................... | F02C 6/08 60/782 |
| 2014/0008170 A1* | 1/2014 | Vanderzyden | ............ | F16D 9/08 192/56.5 |
| 2014/0250860 A1* | 9/2014 | Sidelkovskiy | .......... | F01D 15/08 60/39.15 |
| 2014/0325992 A1* | 11/2014 | Summerfield | ............ | F02C 7/32 60/796 |
| 2015/0001339 A1* | 1/2015 | Gagne | .................. | B64C 39/024 244/58 |
| 2015/0191252 A1* | 7/2015 | Cline | .................... | B64D 31/12 60/39.24 |
| 2016/0340051 A1* | 11/2016 | Edwards | ................ | B64D 27/02 |

FOREIGN PATENT DOCUMENTS

| | | |
|---|---|---|
| EP | 2728141 | 5/2014 |
| EP | 2889452 | 7/2015 |
| GB | 2476261 A | 6/2011 |
| KR | 20100080010 A | 7/2010 |

OTHER PUBLICATIONS

Extended European Search Report from counterpart EP Application No. 19157651.1 dated Jul. 15, 2019, 5 pgs.

Response to Communication pursuant to Rule 69 and 70a(1) EPC from counterpart EP Application No. 19157651.1 dated Sep. 23, 2018, 4 pgs., filed Jan. 9, 2020.

\* cited by examiner

ELECTRICAL POWER GENERATOR SYSTEM

CROSS-REFERENCE TO RELATED APPLICATIONS

This specification is based upon and claims the benefit of priority from UK Patent Application Number GB 1804128.5 filed on Mar. 15 2018, the entire content of which is incorporated herein by reference.

BACKGROUND

Technical Field

The present disclosure relates to an electrical power generator system.

Description of the Related Art

Aero gas turbine engines typically have electrical power generators as engine-driven accessories for meeting aircraft electrical power demands. Conventionally, such generators are mounted on and driven by an accessory gearbox which is external to the engine fan case or core. The gearbox is powered from one of the engine's spools via a system of gearboxes and shafts. This is typically the engine's high-pressure spool.

Aircraft electrical and electronic systems are sized by the frequency range they must accommodate. Accordingly, it is advantageous to limit this frequency range, and conveniently the engine's high-pressure spool naturally has a narrow frequency band. However, drawing large amounts of mechanical power from the high-pressure spool adversely affects engine operability.

Thus it would be desirable to be able to power a generator from an engine's intermediate-pressure or low-pressure spool. However, these spools have much wider speed ranges than the high-pressure spool. For example, at ground idle, the fan of a turbofan may be spinning at just 12% of its maximum speed. This represents an 8:1 speed range in the corresponding spool, which would be unacceptable for a generated electrical power frequency range. Typically, generated power frequency ranges of about 2:1 or less are acceptable. Sizing the generator for the minimum spool speed and managing its output electrically at higher speeds would not be competitive due to the very large size of low frequency generators. Alternatively, a limited frequency range can be achieved by using an Integrated Drive Generator (IDG) which has a constant speed hydraulic drive to achieve a narrow output speed range from a broader input speed range. However, IDGs are inherently inefficient, extracting more power than required from the engine core and requiring large coolers to remove waste heat. Accordingly, they are typically used only where the power demand is comparatively small.

Thus it would be desirable is to use a gearbox to deliver a limited (e.g. conventional 2:1) speed range. However, a problem with a speed-shifting gearbox is that it is not possible to interrupt the airframe power demand to off-load the gearbox for a gearshift. A dual-clutch transmission could potentially avoid this problem, but shifting with high torque is likely to result in significant clutch wear. Having two fully-rated generators so that one can take over while the other changes gear is also possible, but this would incur a weight penalty associated with carrying twice the required generator capacity.

SUMMARY

The present disclosure provides a, electrical power generator system, gas turbine engine, and a method of controlling an electrical power generator system, as set out in the appended claims.

The present disclosure is at least partly based on the recognition that a given generator can generally tolerate a severe (e.g. 100%) overload for a limited period of time (typically numbered in seconds), and thus the weight penalty of two fully-rated generators can be avoided by performing gear changes in significantly shorter time periods (e.g. 200 ms). In this way, it is possible to carry only the generator capacity needed, and then shift in two or more stages without interrupting power delivery to the aircraft.

Accordingly, in a first aspect the present disclosure provides an electrical power generator system having:
an input shaft for receiving a rotary input drive;
plural output shafts connected to the input shaft by respective gear shifting arrangements thereby providing different gear ratios between the input shaft and each output shaft; and
plural electrical generators powered by rotation of the respective output shafts, electrical power outputs of the generators being combined to supply a total power to a load;
wherein the input shaft operates over a range of rotation frequencies, and the gear shifting arrangements are configured to shift the gear ratios between the input shaft and the output shafts such that the output shafts operate over a narrower range of rotation frequencies;
the system further having a controller configured to control the gear shifting arrangements, the controller changing the gear ratios of the output shafts when the rotation frequencies of the output shafts reach a limit of the narrower range of rotation frequencies by sequentially performing the steps of:
(i) disconnecting a selected one of the generators from the load such that the remaining connected generator(s) increase their electrical power output(s) to continue to supply the total power to the load,
(ii) changing the gear ratio between the input shaft and the output shaft of the disconnected selected generator so that the rotation frequency of the output shaft of the selected generator moves away from the frequency limit to remain within the narrower range of rotation frequencies,
(iii) reconnecting the selected generator to the load, and
(iv) repeating steps (i) to (iii) for each of the other generators in turn until the gear ratios of the plural generators are changed.

Thus the generator system can tolerate a wide range of input rotation frequencies, enabling it to be driven from, e.g. the fan system of a turbofan gas turbine engine. More particularly, it can turn a wide input frequency range into a narrow output frequency range and a correspondingly narrow output voltage range via suitable control of the gear shifting arrangements. Output power interruption during shifting can be avoided because the system has plural generators, each of which is capable of tolerating a short-term overload as the or each counterpart generator is unloaded and shifted in turn.

In a second aspect the present disclosure provides a gas turbine engine having an electrical power generator system according to the first aspect, the input shaft being operatively connected to a spool of the engine to receive the rotary input drive. The gas turbine engine can be a turbofan engine (e.g. a geared turbofan), the spool which is operatively connected to the input shaft driving a propulsive fan of the engine.

Conveniently, the controller can be a part of an electronic engine controller of the engine.

In a third aspect the present disclosure provides a method of controlling an electrical power generator system having:

an input shaft for receiving a rotary input drive;

plural output shafts connected by respective gear shifting arrangements to the input shaft thereby providing different gear ratios between the input shaft and each output shaft; and plural electrical generators powered by rotation of the respective output shafts, electrical power outputs of the generators being combined to supply a total power to a load;

wherein the input shaft operates over a range of rotation frequencies, and the gear shifting arrangements are configured to shift the gear ratios between the input shaft and the output shafts such that the output shafts operate over a narrower range of rotation frequencies;

the method including sequentially performing the steps of:

(i) when the rotation frequencies of the output shafts reach a limit of the narrower range of rotation frequencies, disconnecting a selected one of the generators from the load such that the remaining connected generator(s) increase their electrical power output(s) to continue to supply the total power to the load, (ii) changing the gear ratio between the input shaft and the output shaft of the disconnected selected generator so that the rotation frequency of the output shaft of the selected generator moves away from the frequency limit to remain within the narrower range of rotation frequencies, (iii) reconnecting the selected generator to the load, and (iv) repeating steps (i) to (iii) for each of the other generators in turn until the gear ratios of the plural generators are changed.

Thus the electrical power generator system of the method can be the electrical power generator system of the first aspect.

Optional features of the present disclosure will now be set out. These are applicable singly or in any combination with any aspect of the present disclosure.

Conveniently, the electrical power generator system may have two output shafts and two respective electrical generators, or three output shafts and three respective electrical generators.

Conveniently, each gear shifting arrangement may be configured to provide two or three different gear ratios between the input shaft and the respective output shaft.

The gear shifting arrangements may include a mechanism to impose predetermined angular relationships between each generator and the input shaft for the different gear ratios associated with each gear shifting arrangement, whereby the generators operate in phase with each other before and after any change in the gear ratios of the output shafts. This allows the electrical power outputs of the generators to be combined on a single bus. The mechanism may comprise respective sets of dog teeth for the different gear ratios of each gear shifting arrangement. For example, if the dog teeth are located on the output shafts, the number of generator poles of each generator may be an integer multiple of the number of dog teeth of the respective set. As another example, if the dog teeth are located on the input shaft, the number of dog teeth of each set multiplied by the respective gear ratio may be an integer factor of the number of generator poles of each generator.

The gear shifting arrangements may have speed-matching systems, such as synchromesh systems, for matching gear speeds when changing the gear ratio. Additionally or alternatively, step (ii) may include inputting power into or extracting power from the disconnected selected generator to match the rotation speed of its output shaft for consistency with the change of gear ratio.

The generators may be permanent magnet generators.

In some applications (particularly those where weight is generally not a critical factor, such as marine or wind turbine applications) it may be beneficial for the generator system to carry redundant generator capacity that is not used at any one time. For example, the electrical power generator system may have three electrical generators of which two are gear-shifted at any one time, and one is kept as an off-line back-up to be brought on-line and gear-switched if a failure develops in one of the other generators requiring it to be shut down and taken off-line. Thus each gear shifting arrangements may be configured to allow its output shaft to be connectable and disconnectable from the input shaft.

DESCRIPTION OF THE DRAWINGS

Embodiments of the present disclosure will now be described by way of example with reference to the accompanying drawings in which.

DETAILED DESCRIPTION

Aspects and embodiments of the present disclosure will now be discussed with reference to the accompanying figures. Further aspects and embodiments will be apparent to those skilled in the art.

Figure 1:
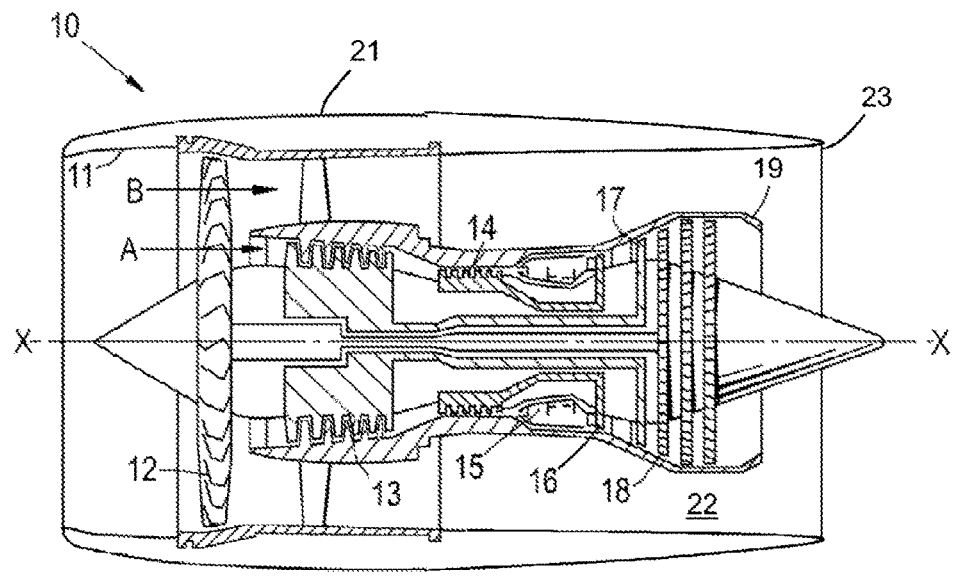
FIG. 1 shows a longitudinal cross-section through a ducted fan gas turbine engine.

With reference to FIG. 1, a ducted fan gas turbine engine is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate-pressure compressor 13 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate-pressure compressors 14, 13 and the fan 12 by suitable interconnecting shafts.

Other gas turbine engines to which the present disclosure may be applied may have alternative configurations. By way of example such engines may have an alternative number of interconnecting shafts (e.g. two) and/or an alternative number of compressors and/or turbines. The engine may comprise a gearbox provided in the drive train from a turbine to a compressor and/or fan.

Figure 2:
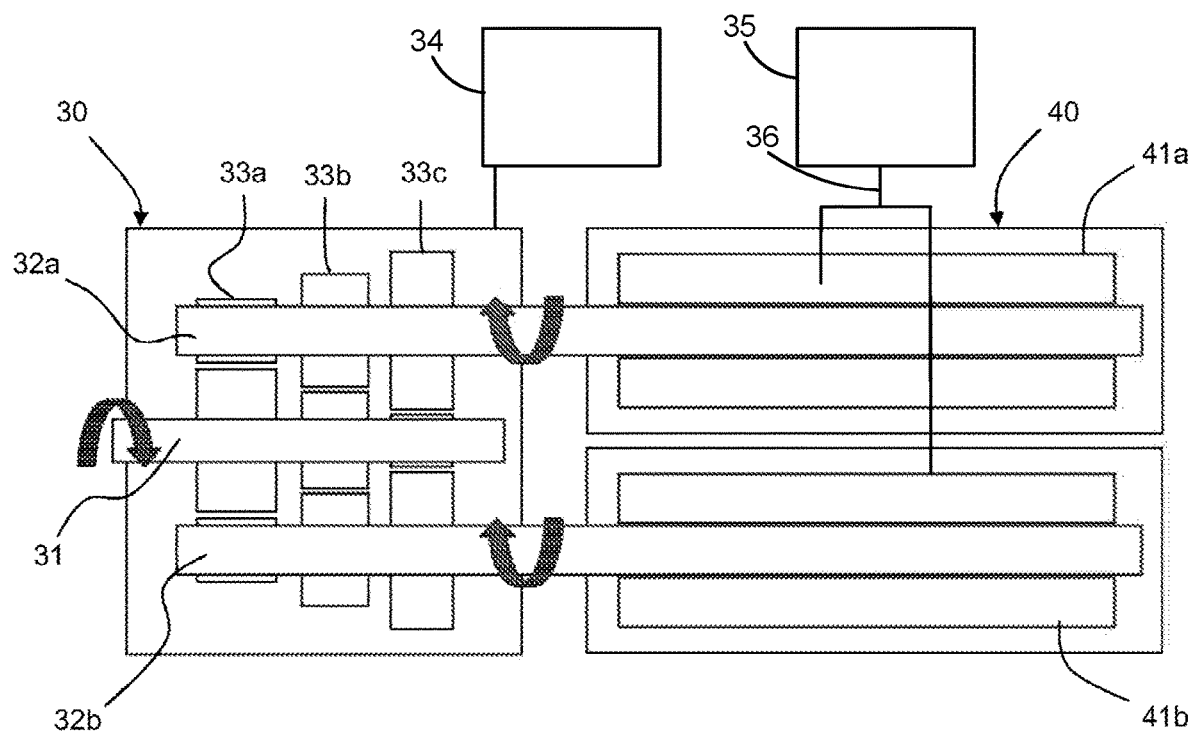
FIG. 2 shows schematically an electrical power generator system for the engine of FIG. 1.

The engine has an electrical power generator system, shown schematically in FIG. 2. The generator system has a gearbox module 30 and a generator module 40. An input shaft 31 of the gearbox module 30 receives a rotary input taken via a suitable intermediary drive from the engine's intermediate-pressure or low-pressure spool. The input shaft 31 is connected via respective gear shifting arrangements to two output shafts 32a, 32b. Each gear shifting arrangement provides high 33a, mid 33b and low 33c gear ratio options for the gearing between the input shaft 31 and the respective output shaft 32a 32b. These arrangements allow the gear ratio between the input shaft 31 and either of the output shafts 32a 32b to be changed independently of the gear ratio between the input shaft 31 and the other output shaft 32a, 32b. The output shafts 32a 32b then extend through to the generator module 40 where they drive the rotors of two electrical generators 41a, 41b. The electrical power outputs of these two generators 41a 41b are typically combined at the same aircraft bus 36 in order to supply a total power to a load 35 provided by the aircraft electrical systems. Conveniently, the generator system may be located in a tail bearing house or on an accessory gearbox.

Thus in normal operation, the electrical load 35 is shared between the two generators 41a, 41b. To maintain the electrical output within voltage and frequency limits as the speed of the input shaft 31 changes, the generator system has a controller 34 which selects the most appropriate gear ratio for the output shafts 41a, 41b. Conveniently, the controller 34 can be an element of the engine's EEC (Electronic Engine Controller).

More particularly, the controller first offloads a first one of the generators 41a (i.e. disconnects its connection to the bus) such that the other generator 41b naturally increases its electrical power output to supply the full system load. This temporary arrangement removes the torque on the active gears between the input shaft 31 and the output shaft 32a, enabling the gearbox module 30 to change the gear ratio for the first generator under no-torque conditions, helping to remove driveline shock and avoiding a need for a clutch. The first generator is then reconnected to the bus to resume its electrical power output to the load. Once this resumption is completed, the sequence of offloading, gear changing and reloading is immediately repeated for the second generator 41b, with the first generator in turn temporarily increasing its electrical power output to supply the full system load. Thereafter, both generators are connected to the bus and share responsibility for supplying the full aircraft load.

An aircraft's electrical architecture conventionally consists of multiple networks, each fed from a respective generator, and loads are switched from one network to another as required to maintain even power supply and manage generator failures or in-flight engine shutdowns etc. The architecture is thus able to accommodate switches between power supplies and thus can similarly accommodate the (short) period between resumption of the first generator 41a and offloading of the second generator 41b during which the two generators may be operating out of phase with each other.

Figure 3:
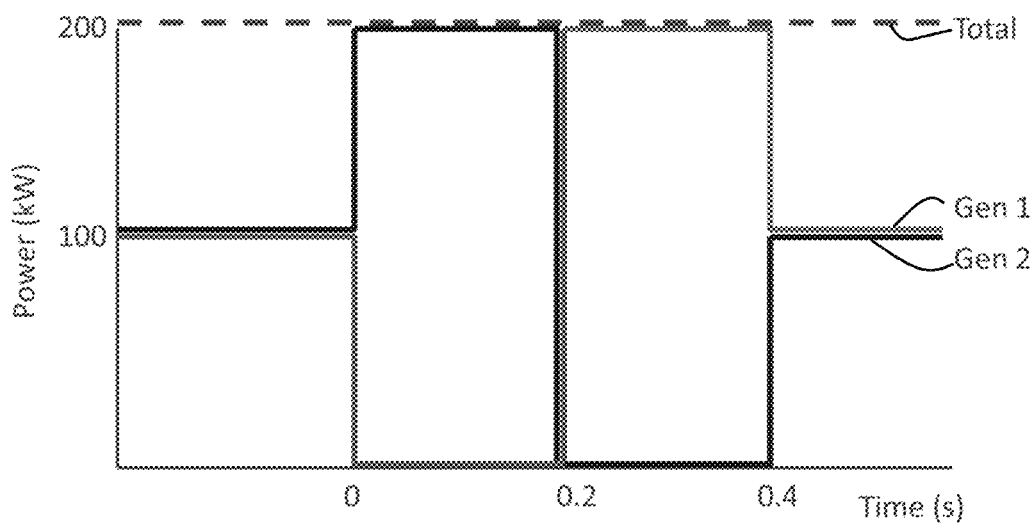
FIG. 3 shows schematically a graph of generator load against time for the two-stage gear shift of the system of FIG. 2.
Figure 4:
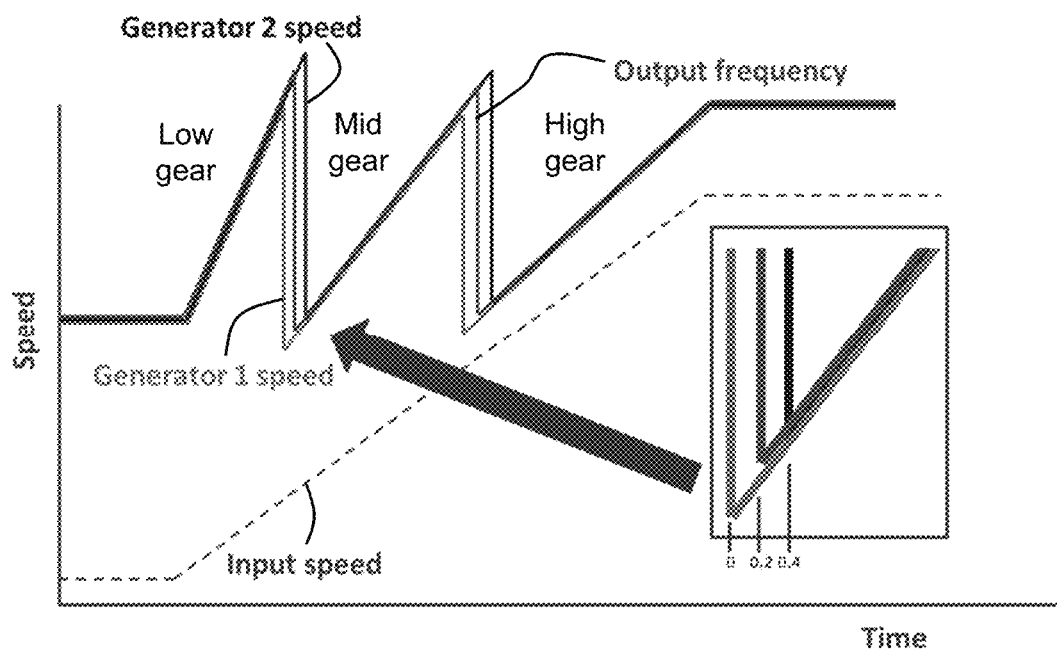
FIG. 4 shows schematically a graph of rotational speed and output frequency against time for the input shaft and generators over the gear changes of the system of FIG. 2.

The generator system avoids the weight penalty of having two fully-rated generators by recognising that a generator can generally tolerate a severe (in this example 100%) overload for a number of seconds—substantially longer than the approximately 200 ms of time required to change gear. In particular, the short duration of the gear shift can effectively eliminate thermal transients in the generators. Accordingly, the generators 41a, 41b can be sized to meet the generator capacity needed in normal operation (i.e. in this example sized to meet just 50% of the total load), and then gear shifted in two stages as outlined above without interrupting power delivery to the aircraft. FIG. 3 shows schematically a graph of generator load against time for such a two-stage gear shift and assuming a 200 kW total load. FIG. 4 shows schematically a graph of rotational speed and output frequency against time for the input shaft 31 and generators 41a, 41b over the gear changes from the low gear ratio 33c, to the mid gear ratio 33b and ending at the high gear ratio 33a.

To enable both generators 41a, 41b to operate in phase with each other before and after each change in gearing so that they can be connected to the same aircraft bus, a mechanism can be provided to impose predetermined angular relationships between each generator and the input shaft 31 for the different gear ratios 33a-c of each gear shifting arrangement. For example, the mechanism may be based on a respective set of dog teeth for each gear ratio of each gear shifting arrangement. If the dog teeth are located on the output shafts, by ensuring that the number of generator poles of each generator is an integer multiple of the number of dog teeth in the sets of dog teeth, the two generators can be kept in phase when they are both driven at the same speed, and hence can share the electrical load on a single airframe electrical bus. If the dog teeth are located on the input shaft, a similar result can be achieved by ensuring that the number of dog teeth of each set multiplied by the respective gear ratio is an integer factor of the number of generator poles of each generator. Additionally or alternatively, to better avoid driveline shock, the gear shifting arrangements may have synchromesh or other speed-matching systems for matching gear speeds when changing the gear ratio.

Overall, the generator system described above allows power to be extracted from the low-pressure spool of a gas turbine, enabling a more highly loaded and more efficient core engine. It also enables generation from this spool without the heat rejection inherent in other variable-speed drive systems that might be used in its place. For example, IDGs are 80-90% efficient and continuously variable transmissions (CVTs) are 90-95% efficient, while mechanical gears, such as those used in the generator system described above, can be greater than 99% efficient. Thus sizing estimates suggest that the generator system can be made significantly lighter than an equivalently-rated system based on a single generator plus CVT or on an IDG, and without attendant requirements for traction fluid, temperature limitations etc. Furthermore, the generator system can achieve these efficiencies without the driveline harshness and power interruption that would be inherent in a system having a single generator which could not be off-loaded during a gear shift.

A further advantage of the generator system is that the gear shifting arrangement can allow a given generator to be disconnected in case of an internal fault. This can facilitate adoption of permanent magnet generators rather than wound field generators, permanent magnet generators having desirable weight and performance characteristics but suffering from problematic failure scenarios. On disconnection of a faulty permanent magnet generator, the remaining generator can be temporarily overloaded while the aircraft power demand is reduced to a sustainable level (without further gear shifting of the remaining generator), although if necessary both generators can be disconnected.

Another option for avoiding driveline shock is to input power into or extract power from a generator when it is disconnected from the load to match its speed to the speed of the input. This can be a particularly valuable approach where the generator has large inertia e.g. it is a starter-generator or other motor-generator. Power electronics, variable frequency control, or similar may be used to control the input or extraction of power.

Although the generators 41a, 41b described above in relation to FIGS. 2 to 4 are the same size, it is possible for the generators to be of different sizes.

Although the generator system described above has two generators, the system may have more than two generators. For example, three generators or more permit gear shift ability to be maintained in the event of the failure of one generator. The generators of a three generator system could be sized so that each generator provides ⅓ load, or the three generators could each be sized for ½ load for full redundancy.

Although described above in relation to an aero gas turbine engine, other potential uses for the generator system are in marine and industrial gas turbine engines. Indeed, more generally, the generator system can bring benefits where tolerance of a wide input speed range is important, such as in wind or tidal turbines.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Moreover, in determining extent of protection, due account shall be taken of any element which is equivalent to an element specified in the claims. Various changes to the described embodiments may be made without departing from the scope of the invention.

We claim:

1. An electrical power generator system having:
    an input shaft for receiving a rotary input drive;
    a plurality of output shafts connected to the input shaft by respective gear shifting arrangements thereby providing different gear ratios between the input shaft and each output shaft; and
    a plurality of electrical generators powered by rotation of the respective output shafts, electrical power outputs of the plurality of electrical generators being combined to supply a total power to an electrical load, wherein each electrical generator of the plurality of electrical generators is configured to be disconnected from and reconnected to the electrical load;
    wherein the input shaft operates over a range of rotation frequencies, and the gear shifting arrangements are configured to shift the gear ratios between the input shaft and the output shafts such that the output shafts operate over a narrower range of rotation frequencies;
    the system further having a controller configured to control the gear shifting arrangements, the controller changing the gear ratios of the output shafts when the rotation frequencies of the output shafts reach a limit of the narrower range of rotation frequencies by sequentially performing the steps of:
    (i) disconnecting a selected one of the plurality of electrical generators from the load such that the remaining connected electrical generator(s) increase their electrical power output(s) to continue to supply the total power to the load,
    (ii) changing the gear ratio between the input shaft and the output shaft of the disconnected selected electrical generator so that the rotation frequency of the output shaft of the selected electrical generator moves away from the frequency limit to remain within the narrower range of rotation frequencies,
    (iii) reconnecting the selected electrical generator to the load, and
    (iv) repeating steps (i) to (iii) for each of the other electrical generators in turn until the gear ratios each electrical generator of the plurality of electrical generators is changed.

2. The electrical power generator system of claim 1, having two output shafts and two respective electrical generators.

3. The electrical power generator system of claim 2, wherein each gear shifting arrangement is configured to provide two or three different gear ratios between the input shaft and the respective output shaft.

4. The electrical power generator system of claim 1, wherein the gear shifting arrangements include a mechanism to impose predetermined angular relationships between each electrical generator and the input shaft for the different gear ratios associated with each gear shifting arrangement, whereby the electrical generators operate in phase with each other before and after any change in the gear ratios of the output shafts.

5. The electrical power generator system of claim 4, wherein the mechanism comprises respective sets of dog teeth for the different gear ratios of each gear shifting arrangement.

6. The electrical power generator system of claim 1, wherein the gear shifting arrangements have speed-matching systems for matching gear speeds when changing the gear ratio.

7. The electrical power generator system of claim 1, wherein step (ii) includes inputting power into or extracting power from the disconnected selected electrical generator to match the rotation speed of the output shaft coupled to the disconnected selected electrical generator for consistency with the change of gear ratio.

8. The electrical power generator system of claim 1, wherein the plurality of electrical generators are permanent magnet generators.

9. A gas turbine engine having the electrical power generator system according to claim 1, the input shaft being operatively connected to a spool of the engine to receive the rotary input drive.

10. The gas turbine engine of claim 9 which is a turbofan engine, the spool which is operatively connected to the input shaft driving a propulsive fan of the engine.

11. The gas turbine engine of claim 9, wherein the controller is a part of an electronic engine controller of the engine.

12. A method of controlling an electrical power generator system having:
    an input shaft for receiving a rotary input drive;
    a plurality of output shafts connected by respective gear shifting arrangements to the input shaft thereby providing different gear ratios between the input shaft and each output shaft; and
    a plurality of electrical generators powered by rotation of the respective output shafts, electrical power outputs of the plurality of electrical generators being combined to supply a total power to a load, wherein each electrical generator of the plurality of electrical generators is configured to be disconnected from and reconnected to the electrical load;

wherein the input shaft operates over a range of rotation frequencies, and the gear shifting arrangements are configured to shift the gear ratios between the input shaft and the output shafts such that the output shafts operate over a narrower range of rotation frequencies;

the method including sequentially performing the steps of:
- (i) when the rotation frequencies of the output shafts reach a limit of the narrower range of rotation frequencies, disconnecting a selected one of the plurality of electrical generators from the load such that the remaining connected electrical generator(s) increase electrical power output(s) of the remaining connected electrical generator(s) to continue to supply the total power to the load,
- (ii) changing the gear ratio between the input shaft and the output shaft of the disconnected selected electrical generator so that the rotation frequency of the output shaft of the selected electrical generator moves away from the frequency limit to remain within the narrower range of rotation frequencies,
- (iii) reconnecting the selected electrical generator to the load, and
- (iv) repeating steps (i) to (iii) for each of the other electrical generators in turn until the gear ratios each electrical generator of the plurality of electrical generators is changed.

13. The method of claim 12, wherein step (ii) includes inputting power into or extracting power from the disconnected selected electrical generator to match the rotation speed of the output shaft coupled to the disconnected selected electrical generator for consistency with the change of gear ratio.

* * * * *